A. MONACHIMOFF.
CALCULATING MACHINE.
APPLICATION FILED NOV. 19, 1907.
930,211.
Patented Aug. 3, 1909.
2 SHEETS—SHEET 1.
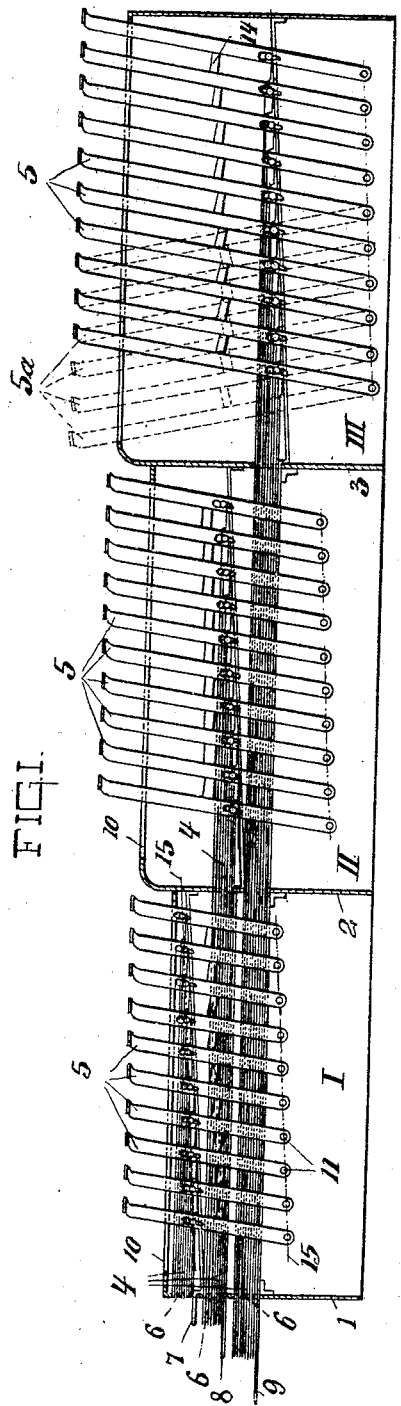
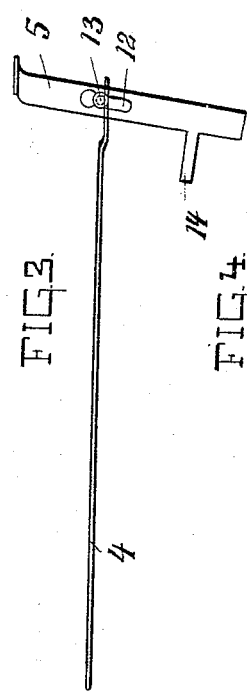
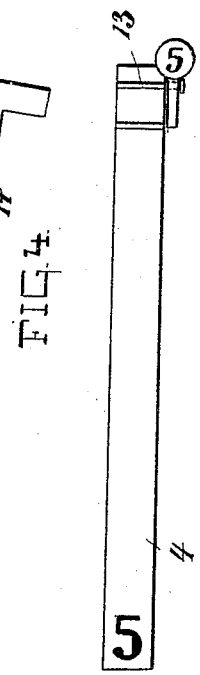
Witnesses:
Inventor:
A. Monachimoff

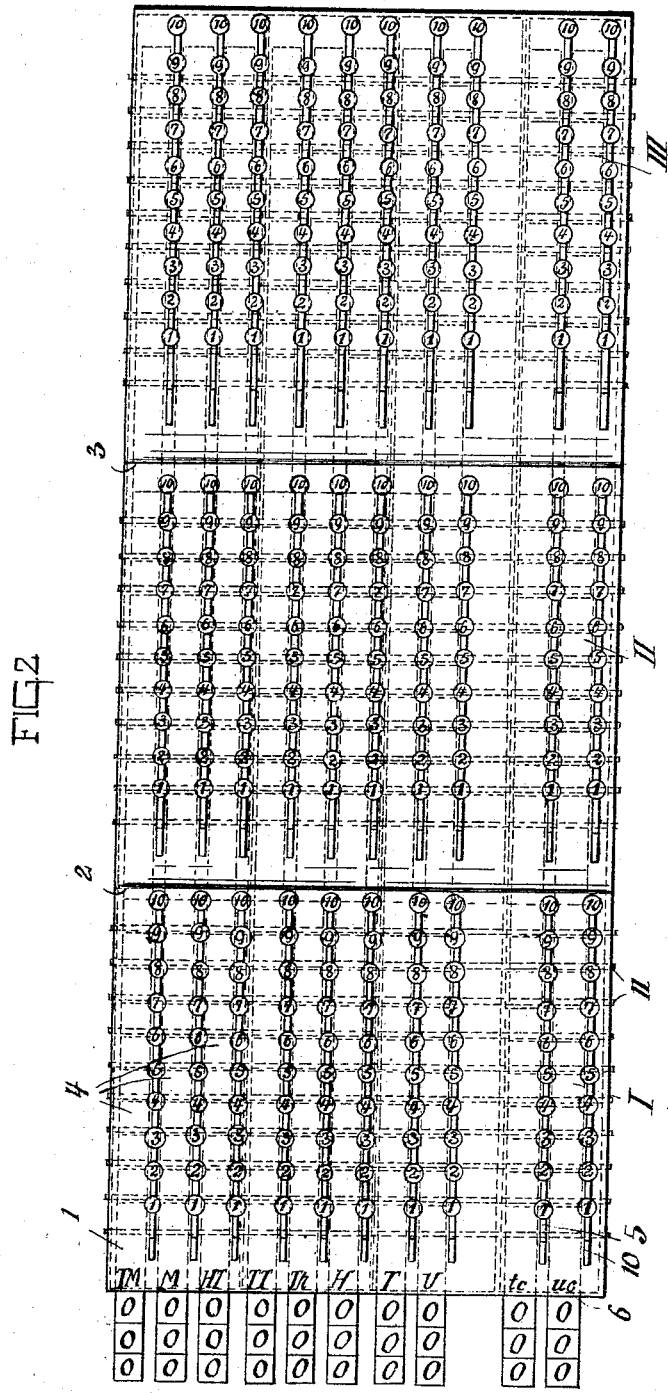

UNITED STATES PATENT OFFICE.

ALEXANDER MONACHIMOFF, OF OBERHAUSEN, GERMANY.

CALCULATING-MACHINE.

No. 930,211.    Specification of Letters Patent.    Patented Aug. 3, 1909.

Application filed November 19, 1907. Serial No. 402,888.

*To all whom it may concern:*

Be it known that I, ALEXANDER MONACHIMOFF, a subject of the German Emperor, and resident of Oberhausen-Rheinland, Germany, have invented certain new and useful Improvements in Calculating-Machines, of of which the following is a specification.

This invention relates to a calculating machine which is particularly adapted for making additions and subtractions, the object being to enable the operator to calculate separately three sums, namely: 1, the sum total of the additions; 2, the sum total of the subtractions, and 3, the difference between both, all three results being simultaneously displayed on the machine.

A further novelty of the machine consists in the arrangement of its single parts, so as to insure, as nearly as possible, an exact manipulation of the same, while unintentional shifting of said parts and a consequent occurrence of errors are effectively avoided.

In the accompanying drawings the invention is illustrated, Figure 1 representing a side view of the machine, in section, Fig. 2 a plan of the same, and Figs. 3 and 4 a side view and a plan respectively of two of the main parts of the machine, namely: a numeral slide with operating lever.

The machine comprises three separate sections, I, II and III, of which, in the example shown, I serves for calculating the sum total of the additions, II for calculating the sum total of the subtractions, and III for calculating the third or end result, i. e., the difference between said sums. All the three sections are inclosed in a covered casing 1 which is open at the bottom and provided with partitions 2 and 3 to separate the single sections from each other. Into each of these sections I, II, III, ten longitudinal rows, each containing ten superposed numeral slides 4, are placed side by side. Two of these rows serve to calculate the units and tens of cents, and the remaining eight rows for calculating the units, tens, hundreds, thousands, ten thousands, hundreds of thousands, millions, and ten millions of dollars, so that, with the machine shown, sums up to 100 millions of dollars can be calculated. The capacity may of course be increased by adding several more longitudinal rows to the machine.

In section I, ten superposed numeral slides 4 of each longitudinal row are so arranged that, in their initial position, resting with their ends in an opening 6 in the front wall of the casing 1, said ends flush with the outer surface of the wall, while each of said slides 4 can, by means of a lever 5, be moved forward so far that the respective numeral becomes visible. The numerals are disposed on the front ends of the slides in such a manner that the lowermost slide carries the numeral 1, the lowest but one 2, the lowest but two 3, and so on, so that the uppermost slide carries the numeral 10.

Projecting through the opening 6, underneath the slides 4, a fixed plate 7 is arranged. The projecting end of said plate is marked with the numeral 0 and flushes with the ends of the slides 4 when in their operated position.

The slides arranged in section II are carried through section I, underneath the slides arranged in this section, and project through other openings 6 in the casing, to the same extent as the plates 7 with which they flush when in their initial position. By means of a lever 5 each of these slides can also be extended and its numeral displayed. The numerals on these slides are arranged in exactly the same manner as in section I, and also here fixed zero plates 8 project underneath the slides, through the same openings in the front wall of the casing, and flush with said slides when in their operated position.

In section III the arrangement of the ten superposed numeral slides 4 is the same as in sections I and II through which said slides are carried, underneath the slides of sections II. The slides of section III also project through openings 6 in the front wall of the casing but extend so much farther as to flush with the plate 8 when in their initial position. These slides are also supported by fixed zero plates 9 which project with the slides through the walls of the casing and flush with said slides when the latter are in their operated position.

As the section I is used for calculating the sum total of the additions, said sum will appear on the uppermost step, that is, above the zero plates 7, while the sum total of the subtractions, being arrived at by means of section II, will be shown on the middle step, that is, above the zero plates 8, and the end result, being calculated on section III, will present itself on the lowermost step, that is, above the zero plate 9.

The operating levers 5 are located inside the casing 1 out of which they project only with their uppermost ends, sliding in longitudinal slots 10. All the levers of each section are arranged in the same plane, and each lever carries the same numeral as the corresponding slide (see Fig. 4). When pressing a lever forward its number will appear on the respective front step of the register. In each section the foremost set of levers carries the numeral 1, the next 2 and so on, up to the rearmost set which thus carries the numeral 10. The operating levers 5 are all attached to the rear ends of their numeral slides 4, so that the numeral slides of each longitudinal row are of different lengths. The slide 10, which is actuated by the rearmost lever, is consequently the longest, and the slide 1, which is actuated by the foremost lever, the shortest. The levers are pivoted with their lower ends on bolts 11 and provided with slots 12 with which they engage with pins 13 fixed to the numeral slides 4. To give the pins 13 free play and prevent them from interfering with the slides next above, the ends of the slides are bent downward as shown in Fig. 3. The levers 5 of one longitudinal row are placed exactly parallel to each other and provided with projections 14 with which they bear against the next levers in front of them. When therefore a lever is pressed forward, all the levers in the same row in front of it, follow the movement automatically, whereas said levers can all be returned to their initial position by pressing the front lever backward. To insure a uniform movement of the slides 4, the connection line 15 of the pins 13, must be exactly parallel to the connection line 15 of the bolts 11 (see Fig. 1, section I).

Each longitudinal row is marked with a letter corresponding to its denomination. Thus, the first row is marked $uc$, which means units of cents; the second one $tc$, to indicate tens of cents; and the remainder U, T, H, TH, TT, HT, M, and TM, in order to indicate units, tens, hundreds, thousands, tens of thousands, hundreds of thousands, millions, and ten millions of dollars.

To explain the manipulation of the machine, an example may serve: On section I, for instance, 6788 dollars and 4321 dollars are to be added. Before starting the manipulation, it must be strictly ascertained that all the levers are in their unoperated position. Then the lever 6 in the sixth row, i. e., the TH-row, is pressed forward, whereby all the levers in the same row in front of it participate in the movement, and the numeral 6 appears in the upper step of the register. In the same manner the numeral 7 is displayed on the fifth, i. e. the H-row; the numeral 8 on the fourth, i. e., the T-row; and again the numeral 8 on the third, i. e. the U-row. To add thereto 4321, instead of moving in the TH-row another four levers forward, the foremost lever (1) of the TT-row is actuated and the difference made up by moving back six levers of the TH-row, which is done by pressing on the foremost of said levers only. Then, in the same manner, instead of three further levers in the H-row, the foremost lever in the TH-row is actuated, and the difference made up by moving back the seven levers in the H-row. Further, instead of advancing two more levers in the T-row, the foremost lever in the H-row is actuated and the difference made up by moving back eight levers in the T-row, and finally one more lever is advanced in the U-row. The result of this calculation is 11109 which is displayed on the uppermost step in front of the machine. It is thus to be observed that when more levers than those left in the row are wanted for an addition, one lever of the next higher denomination is moved forward and the difference made up by moving back in the first-mentioned row the number of levers by which the figure to be added differs from 10. The items to be subtracted are first totalized on section II, the result therefore appearing on the middle-step of the register. Having thus obtained on section I the sum total of the additions, which appears on the upper step of the register, and on section II the sum total of the subtractions, which appears on the middle-step, the difference between these sums is calculated on section III. If, for instance, the sum total of the additions amounts to 687654 dollars, and the sum total of the subtractions, to 543210 dollars, then six levers (see Fig. 1, section III, at 5$^a$) are advanced in the HT-row, eight in the TT-row, seven in the TH-row, six in the H-row, five in the T-row and four in the U-row, whereupon the subtraction is effected by moving back of the advanced levers, five in the HT-row (thus leaving one), four in the TT-row, three in the TH-row, two in the H-row and one in the T-row, the four operated levers of the U-row remaining in their position, so that, as the end result, the number 144444 appears on the lowermost step of the register.

The numeral slides 4 are preferably made of very thin plate steel, as, on the one hand, they must be made quite straight and, on the other hand, they must not, when superposed, take up too much room.

Having fully described my invention, what I claim and desire to secure by Letters Patent is:—

1. A calculating machine, comprising in combination, a casing divided into three separate sections, independent systems of superposed numeral slides arranged in each section and all carried in rows to the front of said casing, an operating lever connected to each slide and adapted to be operated so as to display its numeral in the respective step row at the front of the casing, and fixed zero plates arranged underneath each row of slides, substantially as set forth.

2. In a calculating machine, comprising in combination, a casing divided into three separate sections, independent systems of numeral slides carried from each section to the front of the casing and operating levers connected to said slides, the arrangement of said slides in rows containing ten superposed slides numbered upward, one row for each denomination, each section of rows projecting step-wise underneath the other through the front wall of the casing and a fixed zero plate arranged underneath each row, the ends of said plates flushing with the respective slides when in their operated position, substantially as set forth.

3. A calculating machine, comprising in combination, a casing divided into three separate sections, independent systems of numeral slides carried from each section to the front of the casing, operating levers actuating said slides, bolts on which said levers are pivoted, slots on said pivots adapted to engage with pins on said slides, double bends on the ends of said slides to prevent the pins from interfering with the slide next above, the arrangement of the connection lines of said pins in exact parallel with the fulcrums of the respective levers and projections on said levers bearing against the lever in front of each particular lever and adapted to keep said levers in parallel with regard to each other to make the levers in front of the operated lever follow its movement and to make said levers return from operated to unoperated position by pressing the front lever backward, substantially as set forth.

In testimony whereof I have hereunto set my hand in the presence of two subscribing witnesses.

ALEXANDER MONACHIMOFF.

Witnesses:
WILHELM FLASCHE,
CLEMENS HECKMANN.